UNITED STATES PATENT OFFICE.

ANDREW PETERS, OF BROOKLYN, NEW YORK.

PHOSPHATE BAKING-POWDER.

SPECIFICATION forming part of Letters Patent No. 315,831, dated April 14, 1885.

Application filed November 14, 1884. (Specimens.)

*To all whom it may concern:*

Be it known that I, ANDREW PETERS, a citizen of the United States, residing at Brooklyn, in the county of Kings and State of New York, have invented a new and useful Improvement in Phosphate Baking-Powders, of which the following is a specification.

Heretofore various methods have been tried for producing a phosphate baking-powder which will keep for a long period of time. Among these methods may be mentioned desiccating the starch and incorporating phosphoric acid in the starch; but they have not met with much success.

My invention consists in the use of metaphosphoric and pyrophosphoric acid as an essential ingredient in compounding a baking-powder.

The following are the ingredients and their proportions which I prefer to use in my baking-powder: eighty-four parts carbonate of magnesia, eighty-four parts bicarbonate of soda, two hundred and forty parts metaphosphoric and pyrophosphoric acid. In preparing these ingredients I heat orthophosphoric acid to about 200° centigrade, whereby it is converted into metaphosphoric and pyrophosphoric acids, in which condition it enters into the composition. While the orthophosphoric acid may be properly prepared by heating to 200° centigrade, or thereabout, I prefer to bring it to a low red heat, as the process is thereby much abbreviated in point of time, and the results obtained are as good or better than by using a lower degree of heat. Each of the above constituents is used in a powdered dry state, (the drier the better,) and they are mixed intimately together in the ordinary manner in which baking-powders have heretofore been prepared. These proportions might be varied to a considerable extent, and also the first two ingredients named might be varied—as, for instance, the bicarbonate of soda might be omitted and replaced by more carbonate of magnesia, or the carbonate of magnesia might be omitted and replaced by carbonate of soda; but neither of these modifications would produce as good results as the composition which I have specified. Furthermore, in lieu of the carbonate of magnesia, some carbonate of some other alkali or alkaline earth might be used, or a bicarbonate or sesquicarbonate; or starch might be used as one of the ingredients with the metaphosphoric and pyrophosphoric acid. Many modifications would suggest themselves to a person skilled in the art, which would not depart from my invention, provided metaphosphoric and pyrophosphoric acid were contained in the composition.

While in the state of powder the above ingredients remain unchanged; but when used in baking the liquid and heat which are used in the operation cause the metaphosphoric and pyrophosphoric acid to unite with the soda (an alkali) of the bicarbonate of soda, thereby liberating the carbonic-acid gas, which raises the dough.

The baking-powder which I have described is used in the same manner as other baking-powders have heretofore been used—that is to say, for making bread, two tea-spoonfuls of baking-powder may be added to one quart of flour, one tea-spoonful salt, one-half tea-spoonful sugar, and one and one-half pint milk; but of course some of the above ingredients may be omitted or their proportions be greatly varied with perfectly good results.

Phosphate baking-powders are generally recommended by reason of the healthful effects of the phosphate produced in their use, but have heretofore been objectionable, because the acid phosphate which they contained was liable to act spontaneously upon the other ingredients, and thus prevent the powder from being kept for any great length of time.

The use of the metaphosphoric and pyrophosphoric acid in my powder, instead of the acid phosphate, removes this difficulty, and, while preserving the beneficial effects of phosphate powders, greatly increases its lasting qualities.

I claim—

A baking-powder composed, essentially, of a carbonate of an alkaline earth or of an alkali with metaphosphoric and pyrophosphoric acids, substantially in the proportions indicated.

ANDW. PETERS.

Witnesses:
DANIEL H. DRISCOLL,
EDWARD T. ROCHE.